Patented Aug. 10, 1943

2,326,733

UNITED STATES PATENT OFFICE 2,326,733

ACCELERATOR OF VULCANIZATION

Harry L. Fisher, Stamford, Conn., assignor to U. S. Industrial Alcohol Co., New York, N. Y., a corporation of West Virginia No Drawing. Original application May 7, 1941, Serial No. 392,346. Divided and this application November 24, 1941, Serial No. 420,236

3 Claims. (Cl. 260—791)

This invention relates to a new organic compound, to the method of preparing it, and to its practical application, especially as an accelerator of vulcanization of rubber. This new organic substance has various advantageous uses in the rubber and other industries.

It is the object of the invention to provide a new and useful organic compound, a practical method of preparing it and an economical and satisfactory application of the compound in the vulcanization of rubber.

Other objects and advantages of the invention will be apparent as it is better understood by reference to the following specification, in which the preferred embodiments of the invention are described.

The invention pertains particularly to 4,4,6-trimethyl-2-thio-tetrahydro-1,3,2-oxazine which is the product of the reaction of diacetonalkamine (4-amino-4-methyl-2-pentanol) and carbon disulfide.

The reaction probably takes place in accordance with the following equation:

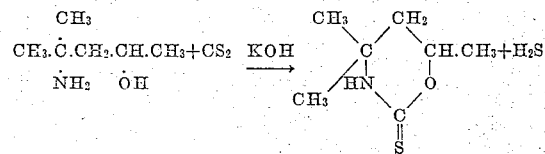

A typical example of a method of preparation of the substance is as follows:

Sixteen grams of potassium hydroxide are dissolved in 200 cc. of absolute alcohol, and 98 grams of diacetanolkamine 4-amino-4-methyl-2-pentanol) and 88 cc. of carbon disulfide slowly added with stirring. After this mixture has stood for about 1 hour, it is heated under reflux for 7-8 hours on the steambath. During this heating hydrogen sulfide gas is evolved, and crystals of the product form in the mixture. The mixture is allowed to cool to room temperature. The crystals are then filtered off and washed with a small amount of cold water. The yield of the oxazine is 125 grams, which is 94% of the theoretical amount. The melting point of the crude product is 208° C., and after recrystalization 210–11° C., uncorrected.

The substance is soluble in hot glacial acetic acid and hot acetone; slightly soluble in cold glacial acetic acid, acetone and dioxane; and practically insoluble in alcohol, water and aqueous alkalies.

Analysis of the purified substance gave the following results:

| | Calculated for $C_7H_{13}ONS$ | Found |
|---|---|---|
| | Per cent | Per cent |
| Carbon | 52.79 | 53.10 |
| Hydrogen | 8.23 | 8.38 |
| Nitrogen | 8.80 | 8.76 |
| Sulfur | 20.13 | 20.00 |
| Molecular weight (by Rast's method) | 159.24 | 152 |

From these results it appears that the reaction goes as indicated above and that the structural formula of the substance is correct as given.

The oxazine shows marked action as an accelerator of vulcanization. Below is given a comparison of the action of the oxazine and a well-known commercial accelerator, mercaptobenzothiazole, popularly called Captax, in a tread stock and a white molded stock. In the tread stock it is seen that although their molecular weights are close together, namely 159 and 167, 1 part of the oxazine is as potent as 1.5 parts of Captax. It is also useful in latex compounds.

The tests were on unaged stocks. The cures are given in the number of minutes at the designated pounds per square inch of steam pressure. T represents the tensile strength in pounds per square inch and E the per cent elongation, both at break.

Tread stock

| | A | B |
|---|---|---|
| Smoked sheet | 100.0 | 100.0 |
| Carbon black | 45.0 | 45.0 |
| Kadox | 5.0 | 5.0 |
| Pine tar | 3.5 | 3.5 |
| Laurex (zinc laurate) | 3.5 | 3.5 |
| Sulfur | 3.0 | 3.0 |
| The oxazine | 1.0 | |
| Captax | | 1.5 |

Tensile strengths and elongations

| Cure | A | | B | |
|---|---|---|---|---|
| | T | E | T | E |
| 30'/30# | 4,240 | 733 | 3,720 | 733 |
| 45'/30# | 4,030 | 680 | 4,070 | 693 |
| 60'/30# | 4,000 | 640 | 4,100 | 673 |
| 75'/30# | 3,860 | 613 | 3,920 | 660 |
| 90'/30# | 3,600 | 616 | 3,900 | 646 |

T-50 at 350%

|  | A | B |
|---|---|---|
| 30'/30# | +1.3 | +4.3 |
| 45'/30# | −7.9 | −3.0 |
| 60'/30# | −12.3 | −8.6 |
| 75'/30# | −15.5 | −13.7 |
| 90'/30# | −18.1 | −17.4 |

White molded stock

|  | C | D |
|---|---|---|
| Pale crepe | 100 | 100 |
| XX72 zinc oxide | 10 | 10 |
| Lithopone | 60 | 60 |
| Keystone whiting | 60 | 60 |
| Sulfur | 3 | 3 |
| Laurex (zinc laurate) | 2 | 2 |
| The oxazine | 0.6 | |
| Captax | | 0.65 |

Tensile strengths and elongations

| Cure | C | | D | |
|---|---|---|---|---|
|  | T | E | T | E |
| 10'/30# | 2,300 | 660 | 1,600 | 643 |
| 20'/30# | 2,500 | 603 | 2,520 | 676 |
| 30'/30# | 2,580 | 620 | 2,680 | 670 |
| 40'/30# | 2,560 | 610 | 2,540 | 646 |
| 50'/30# | 2,380 | 603 | 2,480 | 646 |

T-50 at 500%

|  | C | D |
|---|---|---|
| 10'/30# | +11.4 | +15.7 |
| 20'/30# | +2.8 | −7.2 |
| 30'/30# | −3.2 | −1.0 |
| 40'/30# | −8.8 | −8.0 |
| 50'/30# | −12.4 | −15.4 |

While I have described the preferred method of preparing the new compound it is to be understood that the invention is not limited thereby and that I claim the use of the compound in its various applications other than vulcanization of rubber.

This application is a division of application Ser. No. 392,346 filed May 7, 1941.

I claim:

1. A composition comprising rubber and 4,4,6-trimethyl-2-thio-tetrahydro-1,3,2-oxazine as an accelerator of vulcanization.

2. A process of producing vulcanized rubber products which comprises treating rubber with a vulcanizing agent and 4,4,6-trimethyl-2-thio-tetrahydro-1,3,2-oxazine.

3. A rubber stock comprising the vulcanization product of a rubber stock containing a vulcanizing agent and 4,4,6-trimethyl-2-thio-tetrahydro-1,3,2-oxazine.

HARRY L. FISHER.